United States Patent
Liu

(10) Patent No.: US 10,171,956 B2
(45) Date of Patent: Jan. 1, 2019

(54) NOTIFICATION METHOD, SYSTEM, AND DEVICE FOR VEHICLE

(71) Applicant: Chiun Mai Communication Systems, Inc., New Taipei (TW)

(72) Inventor: Po-Yen Liu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/786,617

(22) Filed: Oct. 18, 2017

(65) Prior Publication Data

US 2018/0109926 A1    Apr. 19, 2018

(30) Foreign Application Priority Data

Oct. 19, 2016  (CN) .......................... 2016 1 0907644

(51) Int. Cl.
*G01S 19/25* (2010.01)
*H04L 29/08* (2006.01)
*H04W 64/00* (2009.01)
*H04W 68/00* (2009.01)
*H04W 4/04* (2009.01)

(52) U.S. Cl.
CPC .......... *H04W 4/046* (2013.01); *G01S 19/252* (2013.01); *H04L 67/26* (2013.01); *H04W 64/006* (2013.01); *H04W 68/005* (2013.01)

(58) Field of Classification Search
CPC ... G01S 19/252; H04W 4/046; H04W 64/006; H04W 4/029
See application file for complete search history.

(56) References Cited

U.S. PATENT DOCUMENTS

| 2010/0121563 A1* | 5/2010 | Chavez ................. G06Q 10/08 701/533 |
| 2014/0059218 A1* | 2/2014 | Ganu .................... H04W 12/08 709/224 |
| 2017/0122764 A1* | 5/2017 | Nakahara ........... G01C 21/3611 |

FOREIGN PATENT DOCUMENTS

| CN | 104680739 A | 6/2015 |
| TW | 519800 | 2/2003 |
| TW | 200931349 A | 7/2009 |
| TW | 201530505 A | 8/2015 |

* cited by examiner

*Primary Examiner* — Kathy W Wang-Hurst
*Assistant Examiner* — Said M Elnoubi
(74) *Attorney, Agent, or Firm* — ScienBiziP, P.C.

(57) ABSTRACT

A notification method for a vehicle to remind a passenger of arriving at a target station is disclosed. The notification method includes: establishing a wireless communication connection between an electronic device and the vehicle, receiving a target station sent from the electronic device, obtaining navigation information of the vehicle, and sending an arrival notification to the electronic device when the vehicle is approaching the target station. A notification system and device are also provided.

8 Claims, 3 Drawing Sheets

NOTIFICATION METHOD, SYSTEM, AND DEVICE FOR VEHICLE

FIELD

The disclosure generally relates to a notification method, system and device, and particularly to a notification method, system and electronic device for a vehicle to send a notification to each passenger.

BACKGROUND

Vehicle, such as buses, trains, or the like, can provide a notification service to all passengers by displaying notifications on public displays or by broadcasting. For example, a station name of an approaching station is broadcasted or shown on the public displays before the vehicle arrives at the station. Passengers need to pay attention to these notifications. If the passenger misses the notification, the passenger is likely to miss the station.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
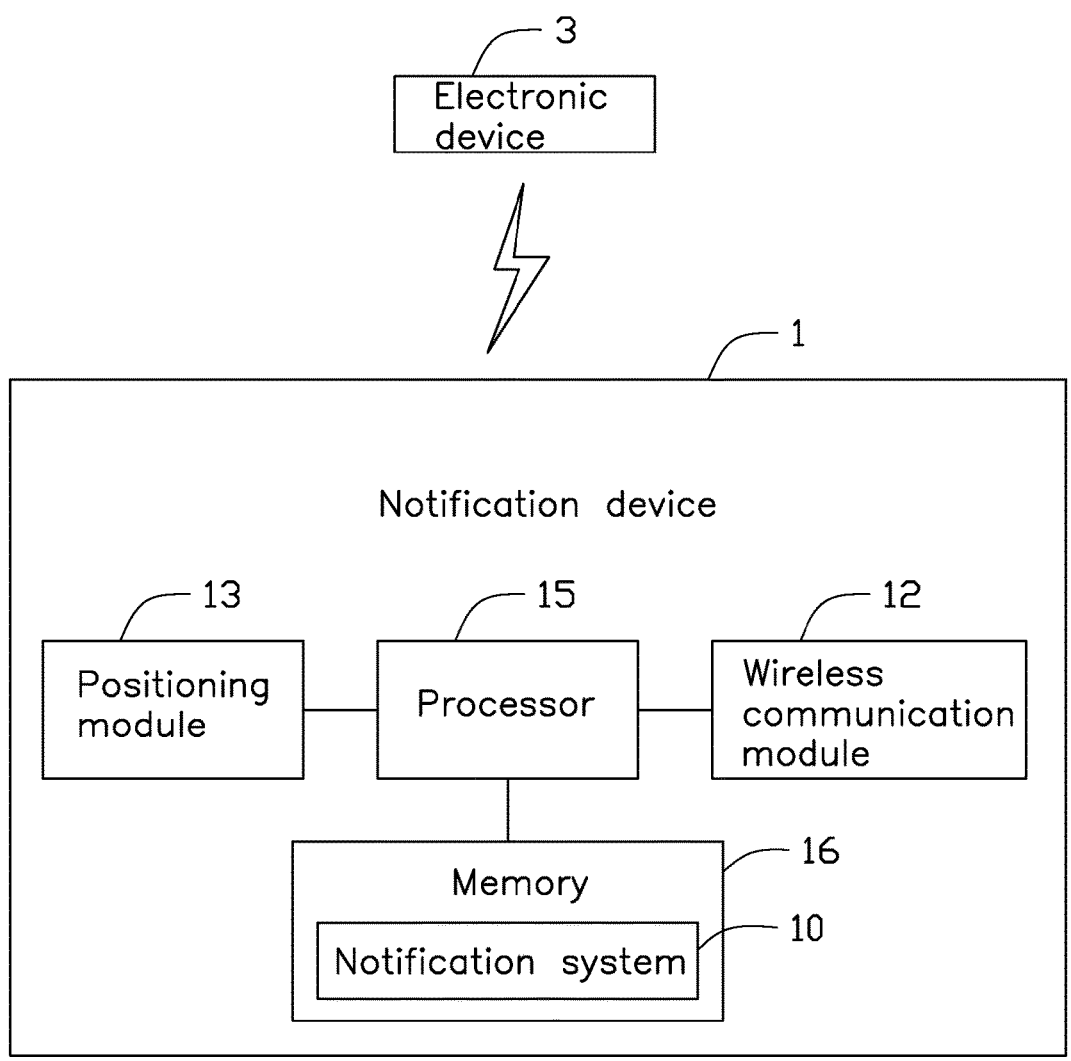
FIG. 1 is a functional block diagram of an exemplary embodiment of a notification device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Further, the description is not to be considered as limiting the scope of the embodiments described herein. The drawings are not necessarily to scale and the proportions of certain parts may be exaggerated to better illustrate details and features of the present disclosure.

FIG. 1 shows a notification device 1 in accordance with an exemplary embodiment. The notification device 1 can be a navigation device, installed in the bus, train and other vehicle. A notification system 10 is installed and operated in the notification device 1. The notification system 10 can receive a target station from an electronic device 3 carried by a passenger. The notification system 10 can transmit an arrival notification to the electronic device 3 when the vehicle approaches at the target station, to remind the passenger of getting off the vehicle.

In this embodiment, the electronic device 3 can be mobile phones, smart bracelets, smart wristband, smart watches and other communication devices. The passenger can input the target station to the electronic devices 3. The electronic device 3 transmits the target station to the notification device 1 and receives a timely notification from the notification device 1. Then, the electronic device 3 can output the arrival notification to remind the passenger of getting off the vehicle at the target station.

The notification device 1 includes a wireless communication module 12, a positioning module 13, a memory 16, and a processor 15.

In this embodiment, an identification code can be set on the vehicle. The identification code can be, but is not limited to, two-dimensional bar code, and QR Code (Quick Response Code) and be in a printed form visibly pasted on the vehicle. The identification code includes an application download address and can be identified by the electronic device 3. An application can be downloaded from the application download address and run by the electronic device 3. The application enables and supports the electronic device 3 in interacting with the notification system 10. For example, the electronic device 3 is enabled to send the target station to the notification system 10 and to receive the arrival notification sent by the notification system 10. The passenger can use the electronic device 3 to identify the identification code including a download address when getting onboard the vehicle, for example, by scanning the identification code through a camera of the electronic device 3 and analyzing the identification code for the download address. The application is then downloaded and run, so that the electronic device 3 can interact with the notification system 10.

In another embodiment, an identification code can be set in a NFC (Near Field Communication) module of the vehicle. The passenger can obtain the application download address through an NFC module of the electronic device 3. When the passenger gets aboard the vehicle, the passenger can use the NFC module of the electronic device 3 to read the identification code of the NFC module of the vehicle. The electronic device 3 identifies the download address contained in the identification code, and then downloads, installs, and runs the application, so that the electronic device 3 can interact with the notification system 10.

It is to be understood that, the electronic device 3 can determine whether or not the application has been previously installed. If the electronic device 3 has installed the application already, the electronic device 3 does not need to download and install the application through the identification code or the NFC module, and just needs to start the installed application.

The wireless communication module 12 is configured for establishing a wireless communication connection with the electronic device 3, so that the electronic device 3 can communicate with the wireless communication module 12. The wireless communication module 12 can be a WI-FI module or a BLUETOOTH module.

The positioning module 13 is configured for obtaining a navigation information and a route of the vehicle, so that the passenger can set the target station. The positioning module 13 can obtain the navigation information of the vehicle through a GPS or a BEIDOU system or other satellite positioning system.

The processor 15 is configured for executing the operating system and the applications of the notification device 1, for example, the notification system 10. The memory 16 is embedded in the notification device 1. In an alternative embodiment, the memory 16 can also be a separate external memory card, for example, an SM card (Smart Media Card), an SD card (Secure Digital Card), or the like, and can be applied in the notification device 1. The memory 16 is configured for storing data, for example, as to the target station.

Figure 2:
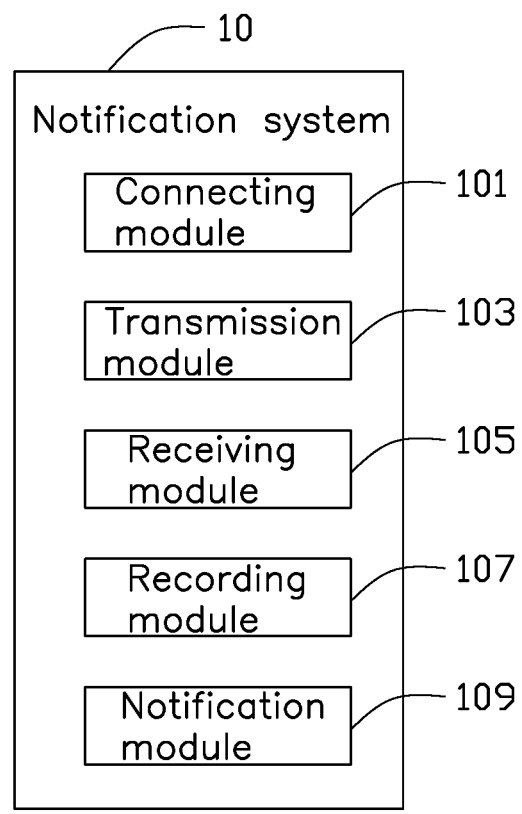
FIG. 2 is a functional block diagram of an exemplary embodiment of notification system.

Referring to FIG. 2, the notification system 10 includes a connecting module 101, a transmission module 103, a receiving module 105, a recording module 107, and a notification module 109.

The connecting module 101 is configured for controlling the wireless communication module 12 to establish a wireless communication connection with an electronic device 3.

The transmission module 103 is configured for sending the navigation information to the electronic device 3 based on the location information and the route of the vehicle. The navigation information includes the route of the vehicle, all stations along the route, and the current location of the vehicle. The passenger can select the target station and set a notification means by the electronic device 3 according to the navigation information. It is to be understood that, the identification code and the NFC module can be omitted. Instead, the transmission module 103 can be configured for automatically sending the installation package of the application or the application address to the electronic device 3, so that the passenger can merely download and install the application on the electronic device 3.

The receiving module 105 is configured for receiving the target stations and the notification means sent from electronic devices 3 of all passengers on the vehicle through the wireless communication module 12. The recording module 107 is configured for recording the number of the passengers at each target station. The recording module 107 is further configured for recording the number of the passengers planning to get off at the target station. Wherein, the number of the passengers at each target station is defined as the number of passengers who take the vehicle when the vehicle arrives at the target station.

In this embodiment, the recording module 107 is configured for detecting a communication address of the electronic device 3. The recording module 107 is further configured for recording the number of the passengers at each target station and the number of the passengers planning to get off according to the communication addresses. The communication address can be a BLUETOOTH address of the electronic device 3 or MAC (Media Access Control) address of the WI-FI module.

When the vehicle is approaching at a station, the notification module 109 is configured for sending a notification to the electronic device 3 that sets the approaching station as the target station through the wireless communication module 12. The electronic device 3 can remind the passenger of getting off at the target station by at least one of vibrating means, ringing means, or a combination thereof.

In another embodiment, the recording module 107 is further configured for recording the number of the passengers who actually get off at each target station. When the number of the passengers that actually get off is less than the number of the passengers who indicated a plan to get off, the notification module 109 sends the notification again to every electronic device 3 that indicated a plan to get off but did not, through the wireless communication module 12.

In this embodiment, the recording module 107 is configured for detecting the wireless signal strength of the electronic device 3. When the wireless signal strength is lower than a preset value, the recording module 107 determines that the passenger has got off, otherwise determines the passenger is still on board.

In this embodiment, the notification means comprise at least one notification location or at least one notification time. Each passenger can set the at least one notification location through the electronic device 3. The notification location can be a station immediately previous to the target station or the one before that, and the like. The notification location also can be within a preset distance before the target station. The preset distance can be for example 1 km, 0.5 km, 0.3 km. The passenger can set the at least one notification time through the electronic device 3. The notification time can be the beginning of a preset time period before arriving at the target station. The notification time can be e.g, 8 minutes, 5 minutes, 3 minutes. When the vehicle approaches at a notification location or a notification time is approached, the notification module 109 sends an approaching notification to the electronic device 3 that presets the notification location or the notification time through the wireless communication module 12.

Figure 3:
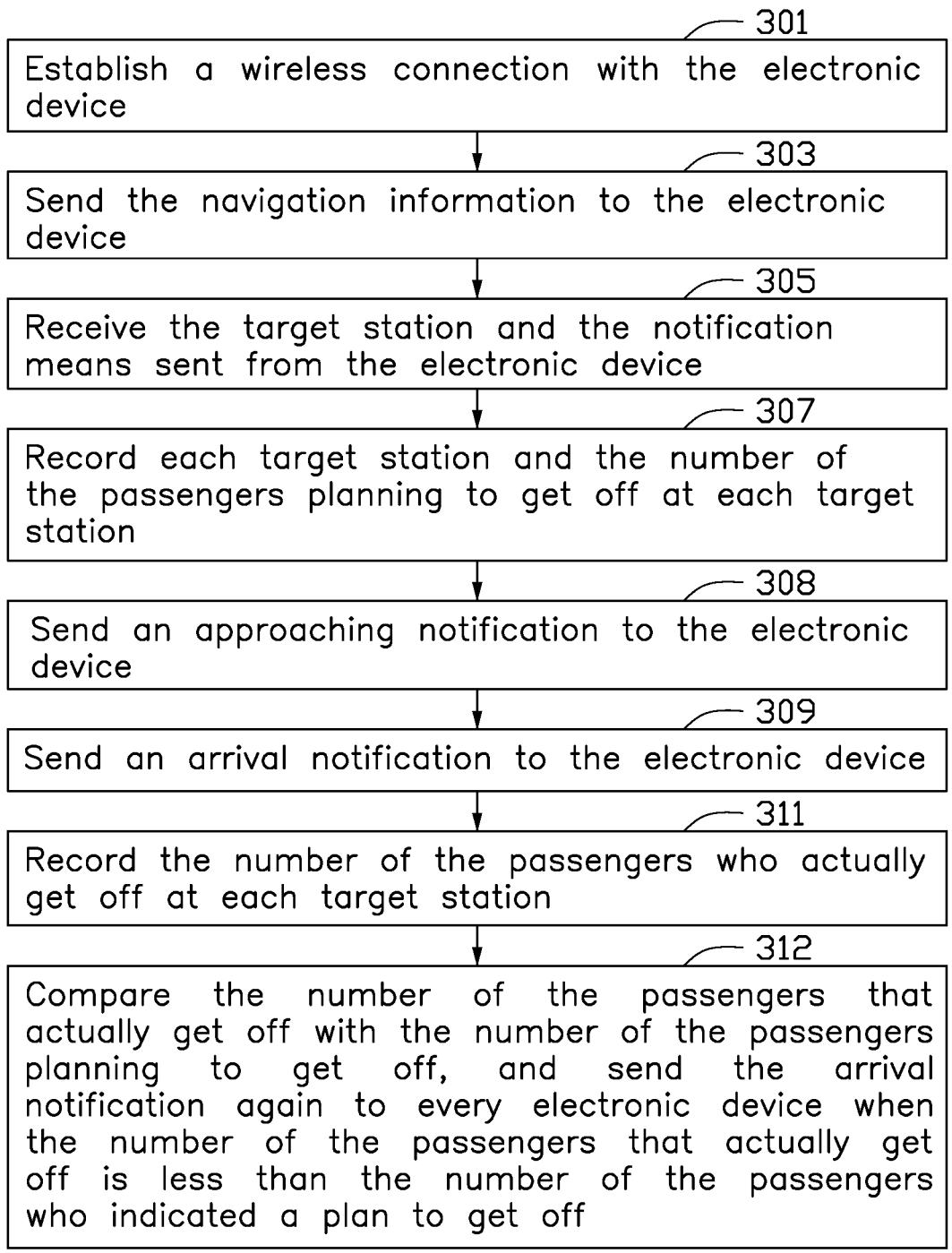
FIG. 3 is a flow diagram of an exemplary embodiment of notification method.

Referring to FIG. 3, a flow diagram of an exemplary embodiment of a notification method is shown, the notification method can begin at step 301.

In step 301, the connecting module 103 controls the wireless communication module 12 to establish a wireless connection with the electronic device 3.

In step 303, the transmission module 103 sends the navigation information to the electronic device 3 according to the location information of the vehicle obtained by the positioning module 13. The navigation information includes the route of the vehicle, the stations along the route, and the current location of the vehicle. It is to be understood, the step 303 can be omitted. The passenger can selects the target station and the notification means according to the actual situation.

In step 305, the receiving module 105 receives the target station and the notification means sent from the electronic device 3 through the wireless communication module 12.

In step 307, the recording module 107 records each target station and the number of the passengers planning to get off at each target station. In this embodiment, the recording module 107 detects the communication addresses of the electronic devices 3 carried by all passengers and recording each target station and the number of the passengers planning to get off at each target station according to the communication addresses. The communication address can be a BLUETOOTH address of the electronic device 3 or MAC (Media Access Control) address of the WI-FI module.

In step 308, as described above, when the vehicle approaches at a notification location or a notification time is approached, the notification module 109 sends an approaching notification to the electronic device 3 that preset the notification location or the notification time through the wireless communication module 12.

In step 309, the notification module 109 sends an arrival notification through the wireless communication module 12 to the electronic device 3 that plan to get off at the target station when the vehicle approaches at any one of the target stations. The electronic device 3 can remind the passenger of getting off at the target station by at least one of vibrating means, ringing means, or a combination thereof.

In step 311, the recording module 107 records the number of the passengers who actually get off at each target station. The recording module 107 can detect the wireless signal strength of the electronic device 3. When the wireless signal strength is lower than a preset value, it is determined that the passenger has got off, otherwise it is determined that the passenger is still on board.

In step 312, the recording module 107 compares the number of the passengers that actually get off with the number of the passengers planning to get off. When the number of the passengers that actually get off is less than the number of the passengers who indicated a plan to get off, the notification module 109 sends the arrival notification again to every electronic device 3 that indicated a plan to get off but did not, through the wireless communication module 12.

It is to be understood, however, that even through numerous characteristics and advantages of the present disclosure have been set fourth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A notification method implemented by a notification device installed in a vehicle, comprising:
    establishing a wireless communication connection with an electronic device;
    receiving a target station sent from the electronic device;
    obtaining a navigation information of the vehicle;
    recording a number of passengers planning to get off at the target station;
    sending an arrival notification to the electronic device when the vehicle approaches at the target station;
    recording a number of the passengers who actually get off at the target station;
    comparing the number of the passengers that actually set off with the number of the passengers planning to get off;
    sending the arrival notification again to the electronic device when the number of the passengers that actually set off is less than the number of the passengers planning to get off;
    sending the arrival notification to the electronic device when the vehicle arrives at the target station and the passenger is still on board;
    detecting a wireless signal strength of the electronic device when the vehicle arrives at the target station; and
    comparing the wireless signal strength with a preset value to determine whether the passenger has got off.

2. The notification method of claim 1, further comprising:
    receiving a notification means sent from the electronic device, wherein the notification means comprise at least one notification location; and
    sending an approaching notification to the electronic device when the vehicle approaches at the at least one notification location.

3. The notification method of claim 1, further comprising:
    receiving a notification means sent from the electronic device, wherein the notification means comprises at least one notification time; and
    sending an approaching notification to the electronic device when the at least one notification time is approached.

4. The notification method of claim 1, further comprising:
    sending the navigation information to the electronic device, wherein the navigation information comprises a route of the vehicle, stations along the route, and a current location of the vehicle.

5. A notification device, installed in a vehicle, comprising a processor, and a memory configured to store a notification system, the processor configured to execute the notification system, wherein the notification system causes the processor to:
    establish a wireless communication connection with an electronic device;
    receive a target station sent from the electronic device;
    obtain a navigation information of the vehicle;
    record a number of passengers planning to get off at the target station;
    send an arrival notification to the electronic device when the vehicle approaches at the target station,
    record a number of the passengers who actually set off at the target station;
    compare the number of the passengers that actually get off with the number of the passengers planning to get off;
    send the arrival notification again to the electronic device when the number of the passengers that actually get off is less than the number of the passengers planning to get off;
    send the arrival notification to the electronic device when the vehicle arrives at the target station and the passenger is still on board;
    detect a wireless signal strength of the electronic device when the vehicle arrives at the target station; and
    compare the wireless signal strength with a preset value to determine whether the passenger has got off.

6. The electronic device of claim 5, wherein the notification system further causes the processor to receive a notification means sent from the electronic device, the notification means comprise at least one notification location; and to send an approaching notification to the electronic device when the vehicle approaches at the at least one notification location.

7. The electronic device of claim 5, wherein the notification system further causes the processor to receive a notification means sent from the electronic device, the notification means comprises at least one notification time; and to send the notification to the electronic device when the at least one notification time is approached.

8. The electronic device of claim 5, wherein the notification system further causes the processor to send the navigation information to the electronic device, and the navigation information comprises a route of the vehicle, stations along the route, and a current location of the vehicle.

* * * * *